Aug. 20, 1935.  H. H. WITZEL  2,012,212
WIRE STRETCHER
Filed Dec. 4, 1934
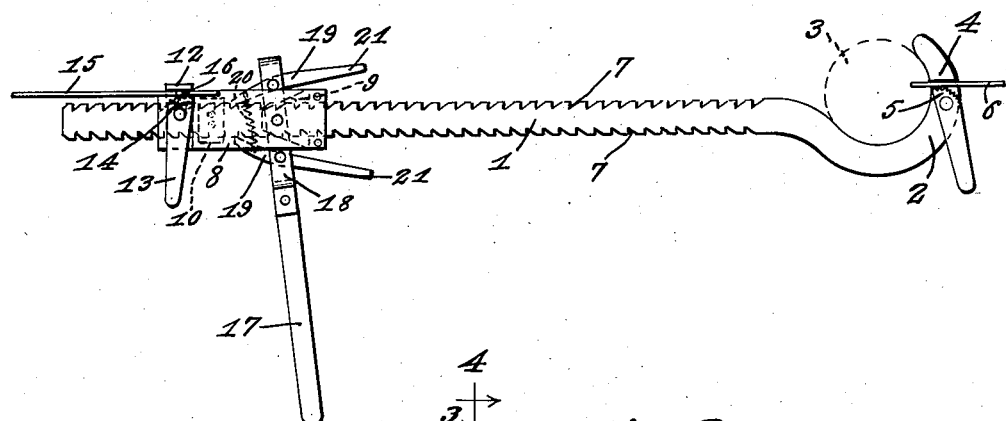
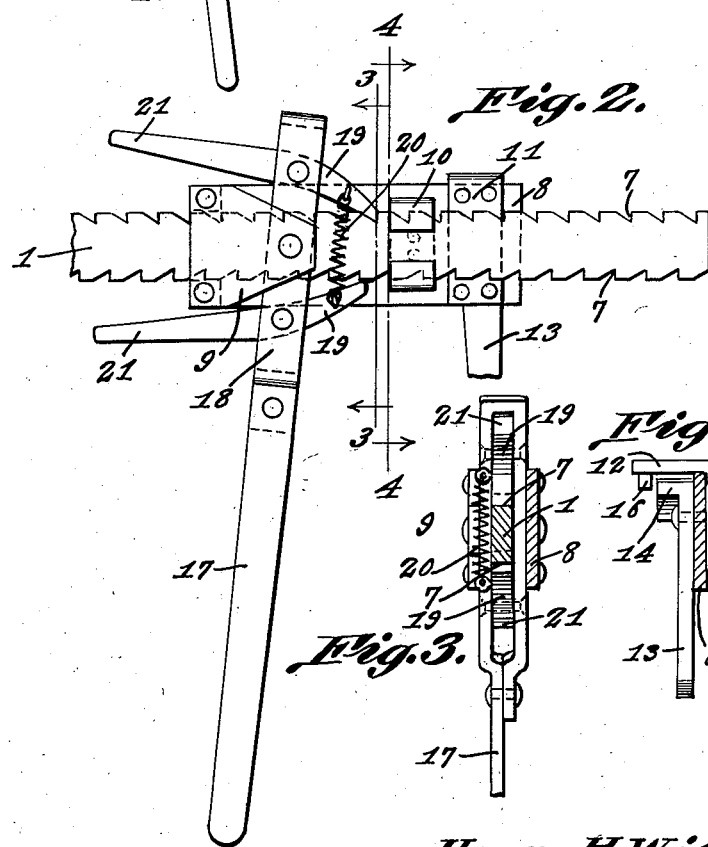
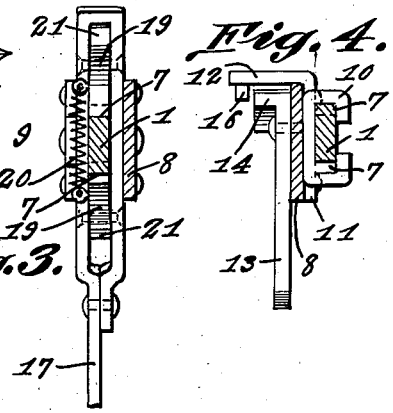
Henry H. Witzel, INVENTOR
BY Victor J. Evans & Co.
ATTORNEY Patented Aug. 20, 1935

2,012,212

UNITED STATES PATENT OFFICE 2,012,212

WIRE-STRETCHER

Henry H. Witzel, Mitchell, S. Dak.

Application December 4, 1934, Serial No. 755,980

1 Claim. (Cl. 254—72)

This invention has for its object the provision of a light, strong and easily handled tool which may be operated readily to stretch a fence wire and draw it to a post, or to draw two wire ends together and hold them while being spliced. A device which will accomplish the stated object is illustrated in the accompanying drawing and the invention consists in certain novel features which will be hereinafter first fully described and then more particularly defined in the appended claims.

In the drawing:

Figure 1 is a top plan view of the entire stretcher.

Figure 2 is a bottom plan view of the working elements of the stretcher on a somewhat larger scale.

Figure 3 is a section on the line 3—3 of Figure 2.

Figure 4 is a section on the line 4—4 of Figure 2.

In carrying out the present invention, there is provided a fulcrum bar 1 having one end formed into a hook 2 adapted to engage around a fence post, indicated at 3. The bill of the hook is provided with a shoulder 4 on its side and an eccentric gripping lever or cam 5 is pivoted adjacent the shoulder to clamp a wire, 6, thereagainst. This engagement of a wire by the tool will resist any tendency of the hooked end to slide down the post, and the construction provides a means for firmly securing one end of a wire when a wire is to be spliced.

The fulcrum bar is provided with ratchet teeth 7 along its opposite edges, the teeth pointing toward the hooked end of the bar and the teeth on one edge being preferably staggered relative to the teeth on the other edge. A wire-carrier is slidably mounted on the fulcrum bar and comprises a plate 8 somewhat wider than the bar and having a keeper or retaining plate 9 secured to its side at one end, the bar passing between the plate 8 and the keeper so that said plate will be held to the bar and may slide along the same. Adjacent the opposite end of the main slide plate, a clip or guide bracket 10 is secured upon the side thereof with its upper and lower ends passing across the edges of the fulcrum bar in hooked relation thereto, as clearly shown in Figure 4. A bracket 11 is secured on the plate 8 between the guide 10 and the adjacent end of the bar and extends across the edge of the bar and beyond the opposite side thereof to form a stationary clamping jaw 12. Cooperating with the jaw 12 is a clamping lever 13 which is fulcrumed on the side of the bar and has a cam or eccentric end 14 presented to the jaw 12, as will be understood upon reference to Figure 4, so that a wire end 15 inserted between the jaw and the lever may be firmly secured. A stud 16 on the jaw 12 prevents the inserted wire slipping from the jaw before it is clamped. The operating lever 17 has its working end portion formed into a loop 18 which passes the fulcrum bar between the same and the retainer 9 and is pivoted to the retainer and the bar. Dogs 19 are pivoted in the ends of the loop 18 to engage the ratchet teeth 7, a spring 20 attached to the working ends of the dogs holding them yieldably to the bar. The dogs are extended beyond the lever and away from the bar, the extended ends 21 constituting handles by which the dogs may be held out of engagement with the ratchets when setting or disassembling the device.

In use the lever is oscillated, after the wire end 15 is secured, and the slide will be thereby moved along the bar, the wire, of course, being drawn along with it and stretched. It will be noticed that when one dog is on the crest of a tooth the other dog is engaged in the notch between two teeth. The lever is rocked about the latter dog as a fulcrum to draw the slide until the inactive dog drops between two teeth whereupon the lever is rocked in the opposite direction, using the dogs alternately as fulcrums and causing the slide and the wire to travel along the bar with a step by step movement. Inasmuch as the construction prevents the working parts moving off the bar when in use, the wire will be stretched expeditiously and with certainty.

It will, of course, be understood that while I have shown and described some parts as rigidly secured together such parts may, wherever practicable, be integral.

Having described my invention, what I claim is:

A wire-stretcher comprising a bar having toothed edges and having a hook at one end adapted to encircle a fence post, a slide plate disposed against one side of the bar and slidable longitudinally of the bar, a keeper secured to the slide plate and disposed at the opposite side of the bar, a guide secured on the plate in spaced relation to the keeper and engaging over the edges of the bar, a jaw secured to the plate and projecting therefrom at the side remote from the bar, an operating lever encircling the bar and pivoted to the plate and the keeper, dogs pivoted to the lever and arranged to alternately engage and fulcrum upon the bar as the lever is oscillated to effect movement of the slide along the bar, and a yieldable connection between the dogs holding them to the bar.

HENRY H. WITZEL.